United States Patent
Sugiyama et al.

(10) Patent No.: US 6,547,667 B2
(45) Date of Patent: Apr. 15, 2003

(54) CONSTANT VELOCITY UNIVERSAL JOINT

(75) Inventors: Tatsuro Sugiyama, Shizuoka-ken (JP); Hisaaki Kura, Shizuoka-ken (JP); Masayuki Kuroda, Osaka-fu (JP); Haruo Nagatani, Shizuoka-ken (JP)

(73) Assignee: NTN Corporation, Osaka-fu (JP)

( * ) Notice: Subject to any disclaimer, the term of this patent is extended or adjusted under 35 U.S.C. 154(b) by 0 days.

(21) Appl. No.: 09/820,169

(22) Filed: Mar. 29, 2001

(65) Prior Publication Data

US 2001/0046899 A1 Nov. 29, 2001

(30) Foreign Application Priority Data

Apr. 13, 2000 (JP) ......................................... 2000-112380

(51) Int. Cl.⁷ ............................................... F16D 3/205
(52) U.S. Cl. ......................... 464/111; 464/124; 464/132
(58) Field of Search ................................. 464/111, 120, 464/122–124, 905, 132; 384/504, 505

(56) References Cited

U.S. PATENT DOCUMENTS

| 3,490,251 A | * | 1/1970 | Roethlisberger | ............ 464/124 |
| 3,748,869 A | * | 7/1973 | Orain | ......................... 464/132 |
| 3,818,721 A | * | 6/1974 | Wahlmark | .................. 464/111 |
| 3,958,847 A | * | 5/1976 | Cain et al. | .................. 384/504 |
| 5,199,925 A | * | 4/1993 | Welschof | ................ 464/905 X |
| 5,989,124 A | * | 11/1999 | Goto et al. | .................. 464/111 |

FOREIGN PATENT DOCUMENTS

| EP | 0 441 671 A1 | * | 8/1991 | ................ 464/111 |
| GB | 298809 | * | 10/1928 | ................ 384/505 |

OTHER PUBLICATIONS

Machine Design—The Bearings Book, 1961 ed., Penton, Apr. 1961, pp. 44 & 45, TJ1061.M3.*

* cited by examiner

Primary Examiner—Greg Binda
(74) Attorney, Agent, or Firm—Arent Fox Kintner Plotkin & Kahn, PLLC

(57) ABSTRACT

A constant velocity universal joint comprises an outer joint member 10 formed with three track grooves 12 having roller guide surfaces 14 arranged in circumferentially opposed relation to each other, a tripod member 20 having three radially projecting trunnions 22, rollers 34 inserted in the track grooves 12, and rings 32 fitted on the trunnions 22 to support the rollers 34 for rotation, the rollers 34 being movable along the roller guide surfaces 14 axially of the outer joint member 10, wherein the roller 34 is composed of a set of annular roller portions 34*a* and 34*b* and a plurality of balls 36 are interposed between outer raceway surfaces formed in rows each in the inner periphery of the annular roller portion 34 and two rows of inner raceway surfaces formed in the outer periphery of the ring 32.

12 Claims, 13 Drawing Sheets

CONSTANT VELOCITY UNIVERSAL JOINT

BACKGROUND OF THE INVENTION a. Field of Invention

This invention relates to a plunging type tripod type constant velocity universal joint. Generally, a constant velocity universal joint is a kind of constant velocity universal joint joining two shafts, on the driving and driven sides, and capable of transmitting torque at constant velocity even if there is an angle between the two shafts, wherein the plunging type allows relative axial displacement between the two shafts, while the tripod type is such that a tripod member provided with three radially projecting trunnions is connected to one shaft and a hollow cylindrical outer joint member provided with three axially extending track grooves is connected to the other shaft, the trunnions of the tripod member being received in the track grooves of the outer joint member to effect transmission of torque.

b. Prior Art

An example of the plunging type tripod type constant velocity universal joint will be described with reference to FIG. 13A. It is constructed in such a manner that the inner peripheral surface of an outer joint member 1 is formed with three axial track grooves 2, and that annular rollers 7 rotatably fitted through a plurality of needle rollers 6 on the cylindrical outer peripheral surfaces of three radially projecting trunnions 5 of a tripod member 4 inserted in the outer joint member 1 are inserted in the track grooves 2. A pair of roller guide surfaces 3 opposed to each other circumferentially of each track groove 2 are concave surfaces (partial cylindrical surfaces) parallel with the axis of the outer joint member 1, while the outer peripheral surface of the roller 7 on each of the three trunnions 5 is a convex surface (partial spherical surface) fit to the roller guide surfaces 3. Each roller 7 is movable axially of the outer joint member 1 along the track groove 2 while engaging the roller guide surfaces 3 of the corresponding track groove 2 and rotating around the axis of the trunnion 5.

When the joint transmits torque at an operating angle θ as shown in FIG. 13B, the relationship is such that the roller 7 and the roller guide surfaces 3 obliquely cross each other as shown in FIG. 13C. In this case, the roller 7 tends to rollingly travel in the direction of arrow t in FIG. 13B, whereas since the roller guide surfaces 3 are partial cylindrical surfaces parallel with the axis of the outer joint member 1, the roller 7 will move while being restrained by the roller guide surfaces 3. As a result, sliding friction occurs between the roller guide surfaces 3 and the roller 7 and sliding resistance is produced. Further, this sliding friction produces induced thrust in the axial direction. Such sliding resistance and induced thrust cause vibration and noise in the car body, influencing the noise, vibration, hardness or NVH performance of automobiles, lowering the flexibility of design of suspensions for vehicles.

As for such plunging type tripod type constant velocity universal joint intended to reduce sliding resistance and induced thrust, for example, one having a construction shown in FIG. 14A is known. As shown, the outer peripheral surfaces of the trunnions 5 of the tripod member 4 are true spherical surfaces, and the cylindrical inner peripheral surface of a cylindrical ring 8 is slidably fitted on the true spherical surface. The ring 8 and roller 7 constitute a roller assembly relatively rotatable through needle rollers 6. The needle rollers 6 are arranged in the full complement bearing condition between the cylindrical outer peripheral surface of the ring 8 and the cylindrical inner peripheral surface of the roller 7 and an annular washer 9 prevents the needle rollers 6 from slipping off. The roller 7 is received in the track groove 2 of the outer joint member 1 and is movable axially of the outer joint member 1 while rolling on the roller guide surfaces 3 of the track groove 2.

The outer peripheral surface of the trunnion 5 is a true spherical surface having a center of curvature on the axis of the trunnion 5, and the roller assembly (7, 8, 9) oscillates around the center of curvature. Since the roller assembly is capable of oscillation, when torque is transmitted at an operating angle formed between the outer joint member 1 and the tripod member 4, the roller 7 is guided by the roller guide surfaces 3 of the outer joint member 1 such that the roller 7 keeps its position parallel with the axis of the outer joint member 1, and with the position unchanged, it correctly rolls on the roller guide surfaces 3. Therefore, the sliding friction reduces when torque is transmitted at a operating angle, and the sliding resistance and the occurrence of induced thrust are suppressed.

It is known to use a plunging type tripod type constant velocity universal joint for transmitting torque from an automobile engine to wheels at constant velocity. A plunging type tripod type constant velocity universal joint, which has spherical rollers attached to the trunnions of a tripod member, is used as a full complement type in which needle rollers serving as rolling elements between the outer peripheral surfaces of the trunnions and the inner peripheral surfaces of the spherical rollers have no cage. And when torque is transmitted at an angle, friction between internal parts causes induced thrust during rotation and forceful axial extension and contraction even in the stopped state causes sliding resistance. As NVH phenomena typical of automobiles taking part in such induced thrust and sliding resistance, there is swaying of the car body occurring in connection with the former during traveling and in connection with the latter there is an idling vibration phenomenon in the drive or D range of an automatic transmission or AT car during stoppage.

Concerning NVH problems of automobiles, the key point for solution is to reduce the induced thrust and sliding resistance of the joint. Generally, the induced thrust and sliding resistance of the joint tend to depend on the size of the operating angle. Therefore, when the joint is to be applied to the drive shaft of an automobile, there occurs a problem of design limitation that a greater operating angle cannot be employed. Therefore, in order to increase the flexibility of design of suspensions for automobiles, it has been necessary to reduce and stabilize induced thrust and sliding resistance.

However, in the conventional plunging type tripod type constant velocity universal joint, since the rolling elements are needle rollers of the full complement type, eccentric loads, such as edge load, tend to act on the rolling element surfaces due to the skewing of the rollers during rotation, etc. Further, the state of contact does not stabilize due to internal clearances and accuracy, and edge load occurs even when the spherical rollers are inclined. Further, structurally, relative slide also occurs between the end of the spherical roller, the trunnion and the washer. Such phenomena as skewing, edge load and relative slide are thought to govern the magnitude of the frictional force in the joint interior.

SUMMARY OF THE INVENTION

Accordingly, an object of the invention is to minimize these frictional forces to further reduce and stabilize induced thrust and sliding resistance.

The invention provides a constant velocity universal joint comprising an outer joint member formed with three track grooves having roller guide surfaces arranged in circumferentially opposed relation to each other, a tripod member having three radially projecting trunnions, rollers inserted in the track grooves, and rings fitted on the trunnions to support the rollers for rotation, the rollers being movable along the roller guide surfaces axially of the outer joint member, wherein the roller is composed of a set of annular roller portions and a plurality of balls are interposed between outer raceway surfaces formed in rows each in the inner periphery of the annular roller portion and two rows of inner raceway surfaces formed in the outer periphery of the ring.

The roller composed of a set of roller portions includes not only two-split roller but also three- or more-part rollers, and a roller in which an intermediate body is interposed between adjacent roller portions. Therefore, in the case of a two-split roller, each roller portion has an outer raceway surface. In the case of a three-part roller, for example, roller portions on opposite sides will be provided each with a outer raceway surface.

Since the roller is of split construction, composed of a set of roller portions, relative rotation of the roller portions is allowed, reducing the sliding resistance and rolling resistance. That is, when torque is transmitted with an operating angle defined between the outer joint member and the tripod member, some rollers swing while describing an arc with respect to the roller guide surface. Since the positions of contact between individual roller portions and the roller guide surface are spaced axially of the trunnion, the distances from the positions of contact between the individual roller portions and the roller guide surface to the axis of the tripod member differ and the peripheral speeds of the two roller portions differ from each other. As the result of the peripheral speeds differing from each other, an angular positional deviation of the roller portions would otherwise occur; however, since relative rotation of the roller portions is possible, such angular positional deviation is accommodated by the relative rotation of the roller portions. Therefore, the sliding resistance and rolling resistance encountered when the roller swings in an arc on the roller guide surfaces are reduced. Further, the split construction of the roller facilitates incorporation of balls and saves the need for providing a receiving groove.

Since the roller interposed between the tripod member and the outer joint member is supported by balls making smooth low-friction rotation at all times without such problems as skewing, a low-friction low-resistance rolling movement is realized when the roller rolls in the track groove of the outer joint member along the roller guide surfaces. Therefore, the sliding resistance produced when the roller slides in the track groove axially of the outer joint member and hence the induced thrust produced when torque is transmitted with an operating angle defined between the outer joint member and the tripod member are further reduced; thus, a high performance, plunging type tripod type constant velocity universal joint producing little vibration or noise can be provided.

Further, supporting the roller by a double row of balls increases the load capacity against moment loads and increases durability, as compared with supporting it by a single row of balls. The spacing between the ball rows can be optionally set. With the ball diameter taken as a criterion, for example, the spacing may be greater or smaller than the ball diameter. In the latter case, the balls in one row will circumferentially alternate with the balls in the other row, e.g., one by one, so that the required number of balls is reduced as a whole, contributing to weight reduction. Further, reducing the spacing between the ball rows reduces the axial spacing from the position of contact between the balls and the roller, and it is thought that it becomes easier for the roller portions to make synchronous rotation.

The inner peripheral surface of the ring may have a convexly arcuate section and the outer peripheral surface of the trunnion a sectional shape which contacts the inner peripheral surface of the ring in a direction orthogonal to the axis of the joint and which defines a clearance between itself and the inner peripheral surface of the ring axially of the joint.

Concerning the cross sectional shape of the trunnion, a shape which contacts the inner peripheral surface of the ring in a direction orthogonal to the axis of the joint and which defines a clearance between itself and the inner peripheral surface of the ring axially of the joint, means, in other words, a shape such that the surfaces opposed to each other axially of the tripod member are retracted toward each other, i.e., toward the smaller diameter side from an imaginary cylindrical surface. A concrete example thereof is an elliptic shape. The term "elliptic shape" as used herein is not limited to literally ellipse but shall include those shapes which are referred to generally as oval shapes.

By employing the shape as the cross sectional shape of the trunnion, the trunnion is allowed to incline with respect to the outer joint member without changing the attitude of the roller assembly when the joint takes an operating angle. Furthermore, as is clear by comparing FIGS. 3 and 14C, since the contact ellipse between the outer peripheral surface of the trunnion and the ring approaches a dot from an oblong, the friction moment tending to incline the roller assembly is reduced. Therefore, the attitude of the roller assembly is stable at all times and the roller is held parallel with the roller guide surfaces, so that it can roll smoothly. This contributes to the reduction of sliding resistance and hence the reduction of induced thrust. Further, there is another advantage that the bending strength of the trunnion is improved due to the increase of the modulus of section of the root of the trunnion. In addition, it is not necessary for the inner peripheral surface of the ring to be of cylindrical shape extending throughout the length; the central portion alone which contacts the trunnion may be cylindrical and the opposite ends may be formed with a relief portion for avoiding interference when the trunnion is inclined.

The roller assembly is interposed between the trunnion and the outer joint member and performs the role of transmitting torque. Since the direction of transmission of torque in this kind of constant velocity universal joint is always orthogonal to the axis of the joint, torque transmission is possible in that the trunnion and the ring are in contact with each other in the direction of torque transmission; even if there is a clearance between the two axially of the joint, there is no hindrance to torque transmission.

Furthermore, since the trunnion can be inclined without inclining the ring, it is possible for the roller to roll smoothly on the roller guide surfaces without being inclined. Therefore, a flange which is sometimes provided in the track groove of the outer joint member for the purpose of controlling the inclination of the roller can be omitted. Omission of such flange achieves not only weight reduction of the outer joint member and simplification of processing but also eliminates the sliding resistance which is caused by sliding contact between the roller and the flange, with the result that further reduction of the sliding resistance and reduction of the induced thrust can be achieved.

The invention is not limited to a form in which the cross section of the trunnion is substantially elliptic, as described above, and is applicable, e.g., to the following arrangements. That is, the inner peripheral surface of the ring may be cylindrical and the outer peripheral surface of the trunnion spherical. A cylindrical bush whose outer peripheral surface is convexly spherical and whose inner peripheral surface is cylindrical may be interposed between the concavely spherical inner peripheral surface of the ring and the cylindrical outer peripheral surface of the trunnion. The longitudinal section of the outer peripheral surface of the roller may be convexly arcuate and the cross section of the roller guide surface concavely arcuate.

The ball and the raceway surface may contact each other at a contact angle. This increases rigidity, thus serving to improve load capacity and durability.

The roller and the roller guide surface may make angular contact with each other. The fact that the roller and the roller guide surfaces make angular contact with each other ensures that the roller hardly deviates and has its attitude further stabilized so that when moving axially of the outer joint member, the roller rolls on the roller guide surfaces smoothly with less resistance. As a concrete example of an arrangement for realizing such angular contact, there may be cited an arrangement in which the generating line of the outer peripheral surface of the roller is a convex arc while the sectional shape of the roller guide surface is a taper or Gothic arch.

The invention thus provides a constant velocity universal joint comprising an outer joint member formed with three track grooves having roller guide surfaces arranged in circumferentially opposed relation to each other, a tripod member having three radially projecting trunnions, rollers inserted in the track grooves, and rings fitted on the trunnions to support the rollers for rotation, the roller being movable along the roller guide surfaces axially of the outer joint member, wherein the roller is composed of a set of annular roller portions and a plurality of balls are interposed between outer raceway surfaces formed in rows each in the inner periphery of the annular roller portion and two rows of inner raceway surfaces formed in the outer periphery of the ring; as a result, the rollers are supported by the balls constantly making smooth low-friction rotation without any problem, such as skewing, and low-friction low-resistance rolling is realized when the rollers are rolling in the track grooves of the outer joint member along the roller guide surfaces. Therefore, a high performance plunging type tripod type constant velocity universal joint can be provided in which the sliding resistance which occurs when the rollers slide in the track grooves axially of the outer joint member, and hence the induced thrust which occurs when torque is transmitted with an operating angle defined between the outer joint member and the tripod member, are further reduced and there is little vibration or noise.

A ring whose inner peripheral surface has a convexly arcuate section is fitted on the outer peripheral surface of a trunnion contacting the inner peripheral surface of the ring in a direction orthogonal to the axis of the joint and having a sectional shape which defines a clearance between itself and the inner peripheral surface of the ring axially of the joint; this arrangement allows the trunnion to incline with respect to the outer joint member without changing the attitude of the roller assembly when the joint takes an operating angle. Furthermore, since the contact ellipse between the outer peripheral surface of the trunnion and the ring approaches a dot from an oblong, the friction moment tending to incline the roller assembly is reduced. Therefore, the attitude of the roller assembly is stable at all times and the roller is held parallel with the roller guide surfaces, so that it can roll smoothly. This contributes to the reduction of sliding resistance and hence the reduction of induced thrust. Further, there is another advantage that the bending strength of the trunnion is improved due to the increase of the modulus of section of the root of the trunnion.

If applied particularly to the drive shaft of an automobile, the constant velocity universal joint of the invention can contribute to the improvement of the NVH characteristics of the automobile which the magnitudes of sliding resistance and induced thrust take part in, and the flexibility of design of suspensions for automobiles is also increased.

DESCRIPTION OF THE PREFERRED EMBODIMENTS

Figure 1A:
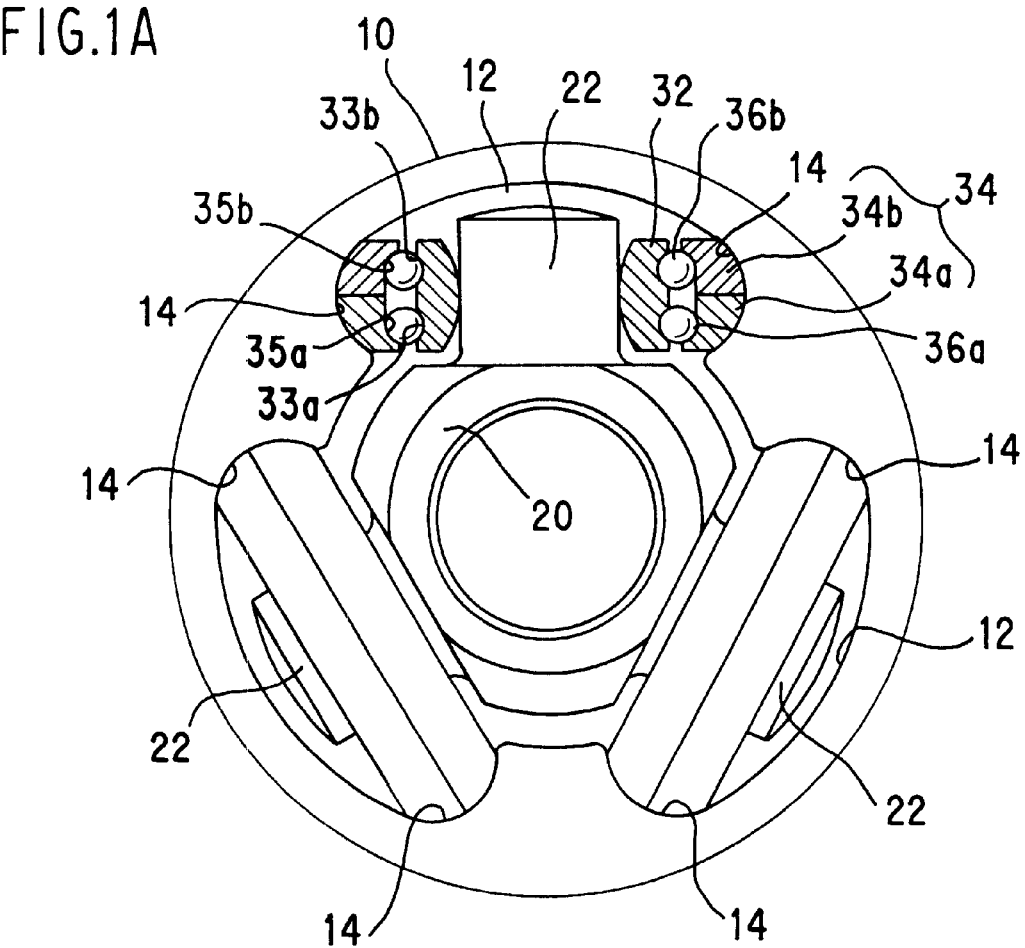
FIG. 1A is an end view in part in section of a constant velocity universal joint according to a preferred embodiment of the invention.
Figure 1B:
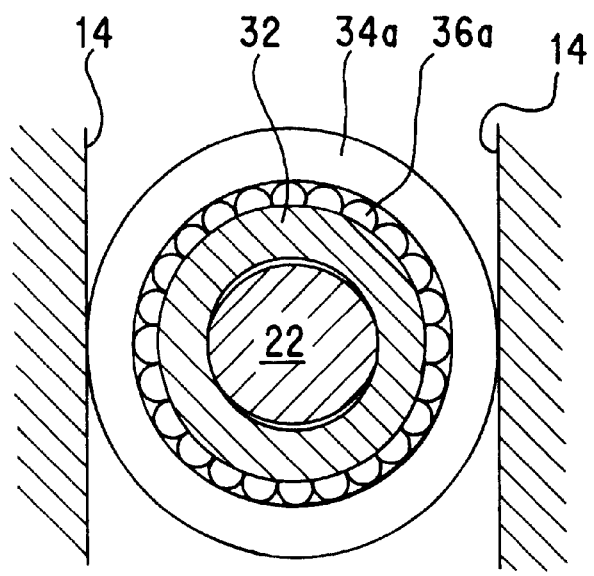
FIG. 1B is a sectional view of the joint shown in FIG. 1A taken perpendicularly to a trunnion.
Figure 2A:
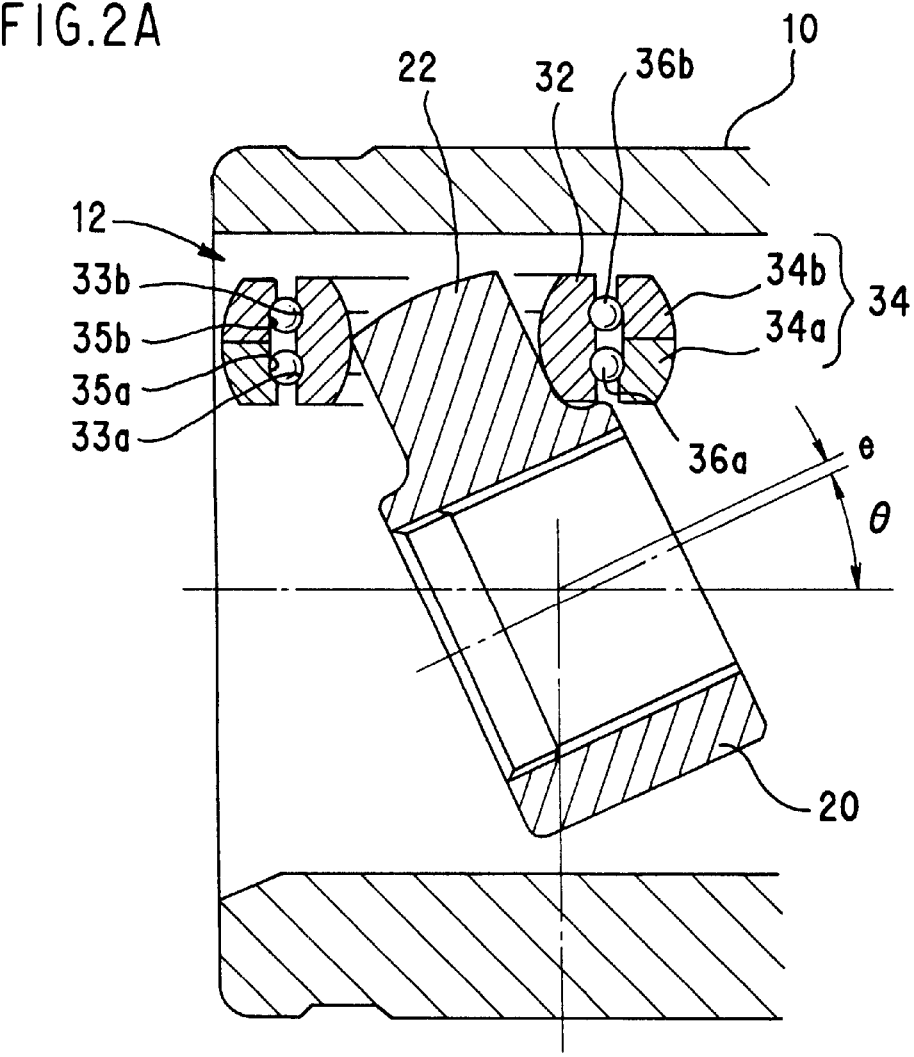
FIG. 2A is a longitudinal sectional view of the joint shown in FIG. 1A, showing the joint taking a operating angle.

Embodiments of the invention shown by way of example in the drawings will now be described. FIG. 1A is an end view of a joint shown in partial sectional view, and FIG. 1B shows a sectional view taken perpendicularly to a trunnion through the joining plane of roller portions. FIG. 2A shows a longitudinal sectional view when a operating angle θ is taken. As shown, a constant velocity universal joint comprises an outer joint member 10 and a tripod member 20, one of two shafts to be connected is connected to the outer joint member 10 and the other is connected to the tripod member 20.

The outer joint member 10 is cylindrical, having a bottom and as shown in FIGS. 1A, 1B, 2A and 2B, has three axially extending track grooves 12 in the inner periphery. Opposed side walls in the circumference of each track groove 12 are formed with roller guide surfaces 14. The tripod member 20 has three radially projecting trunnions 22, each trunnion 22 carrying a roller assembly (32, 34, 36). This roller assembly is received in the track groove 12 of the outer joint member 10.

In this embodiment, the outer peripheral surface of the trunnion 22 has an elliptic form whose major axis is orthogonal to the axis of the joint as seen in a cross sectional view (FIG. 1B) and a straight form parallel with the axis of the trunnion as seen in a longitudinal sectional view (FIG. 2A). In other words, the cross sectional view is congruent in every axial position. The elliptic shape of the trunnion 22 is substantially arcuate with the material thickness as seen axially of the tripod member 20 reduced. In other words, the cross-sectional shape of the trunnion 22 is such that the opposed surfaces as seen axially of the tripod member 20 are retracted toward each other, i.e., toward the smaller diameter side from an imaginary cylindrical surface.

The roller assembly includes a ring 32, a roller 34 and balls 36. The ring 32 fitted on the trunnion 22 is annulus, with the longitudinal section of the inner peripheral surface being convexly arcuate, having inner raceway surfaces 33a and 33b in the outer periphery. The roller 34, which, in this case, is of the two-split construction, is composed of a pair of roller portions 34a and 34b contacting each other at their surfaces perpendicular to the axis. The outer peripheral surface of each of the roller portions 34a and 34b is part of a spherical surface with the center of curvature at a point radially spaced away from the axis, i.e., a partial spherical surface. Each of the roller portions 34a and 34b has an outer raceway surface 35a, 35b in the inner peripheral surface. The ring 32 and the roller 34 are unitized through a plurality of balls 36, constituting a relatively rotatable roller assembly. That is, two rows of balls 36a and 36b are rollably interposed between the inner raceway surfaces 33a and 33b on the outer periphery of the ring 32 and the outer raceway surfaces 35a and 35b on the inner periphery of the roller 34. As shown in FIG. 1B, the balls 36 are incorporated in the so-called all-ball state having as many balls as possible but no cage. Because of the two-split construction, balls can be easily incorporated without requiring receiving grooves or any other special contrivances.

While being carried on the trunnion 22, the roller assembly (32, 34, 36) is received in the track groove 12 of the outer joint member 10. Once received in the track groove 12, the roller assembly retains the unit without coming apart. However, it is preferable that until the roller assembly is received in the track groove 12 or when it is disassembled and taken out of the track groove 12 for maintenance or inspection, it should not come apart. To this end, the outer peripheral surface of the end of the ring 32 is formed with an annular groove 32' and a stop ring 38 is fitted therein so as to axially fix the roller portions 34a and 34b, in the manner shown in FIG. 4A. This makes the unit handling of the roller assembly possible, providing easy handling.

The roller guide surface 14 of the outer joint member 10 in contact with the outer peripheral surface of the roller 34 has a cross-sectional shape fitting the outer peripheral surface of the roller 34. The cross-sectional shape of the roller guide surface 14 is gothic arch, whereby the roller 34 and the roller guide surface 14 make angular contact with each other (see FIGS. 4A, 4B, 5A and 5B). Though not shown, even if the roller guide surface 14 is tapered in cross section with respect to the spherical roller outer peripheral surface, angular contact between them will realize. Employing an arrangement which ensures angular contact between the roller 34 and the roller guide surface 14 in this manner, makes the roller 34 less vibratory, thereby stabilizing its attitude. In addition, in the case where angular contact is not employed, the roller guide surface 14 may be formed, e.g., of part of a cylindrical surface whose axis is parallel with the axis of the outer joint member 10 and its cross-section may be in the form of an arc corresponding to the generating line of the outer peripheral surface of the roller 34.

Figure 4A:
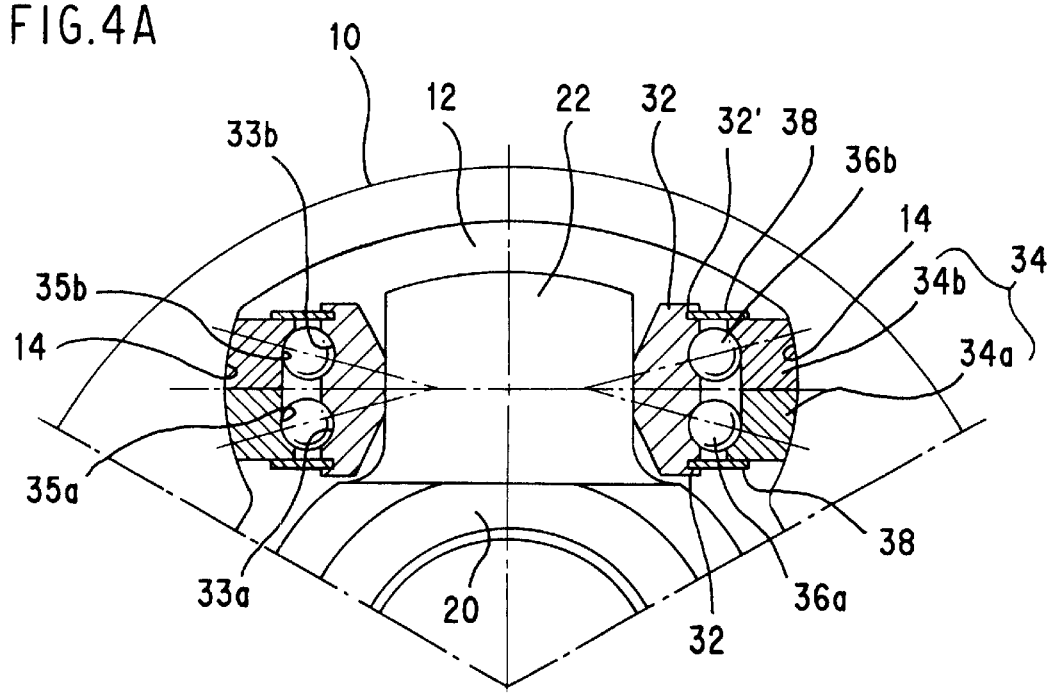
FIGS. 4A and 4B are sectional views showing second and third embodiments, respectively.
Figure 4B:
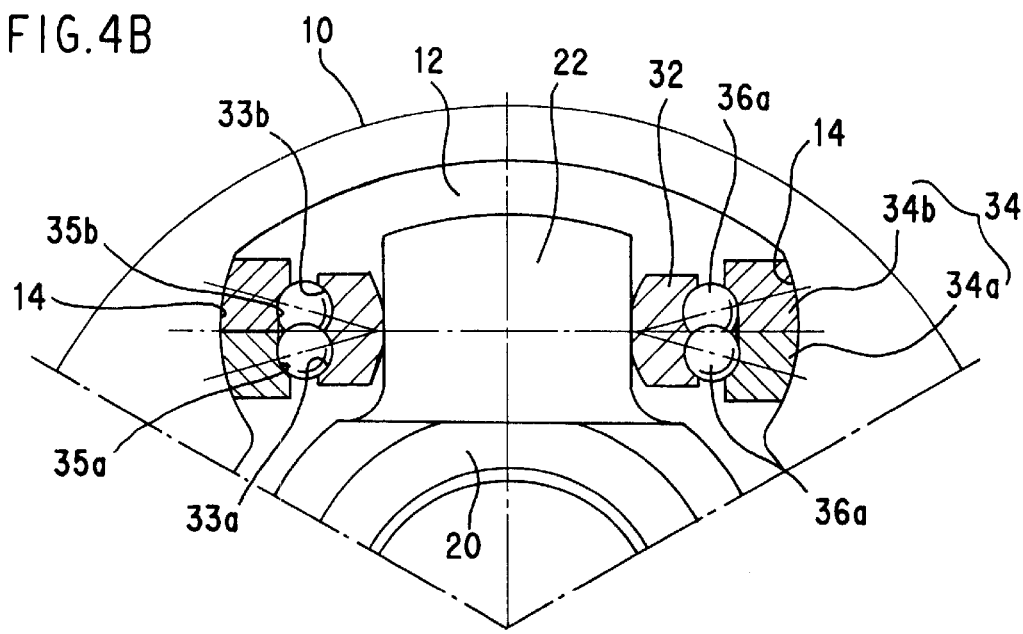

FIG. 4A shows an example in which the distance between the ball rows axially of the two rows of balls 36a and 36b is greater than the diameter of the balls 36; however, as shown in FIG. 4B, the distance between the ball rows may be made less than the diameter of the balls 36. In the latter case, the balls 36a in one row and the balls 36b in the other will circumferentially alternate, e.g., one by one with each other. As is apparent from these figures, it is believed that reducing the distance between the ball rows reduces the axial distance between the contact positions of the balls 36 and the roller 34 and facilitates synchronous rotation of the roller portions 34a and 34b.

Figure 5A:
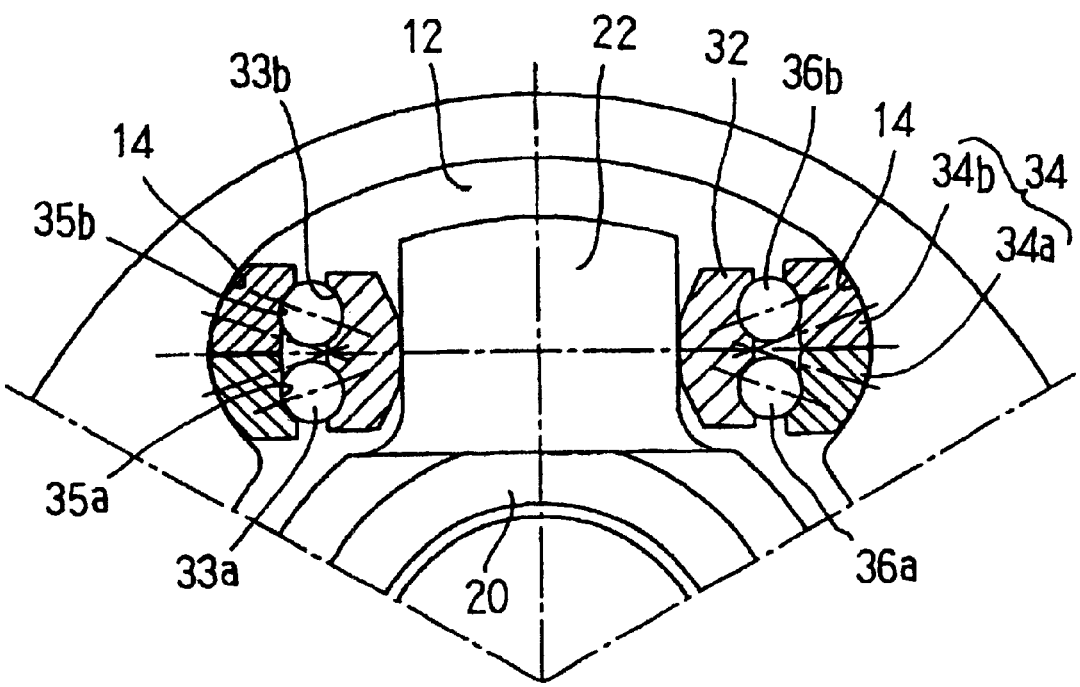
FIGS. 5A and 5B are sectional views showing fourth and fifth embodiments, respectively.
Figure 5B:
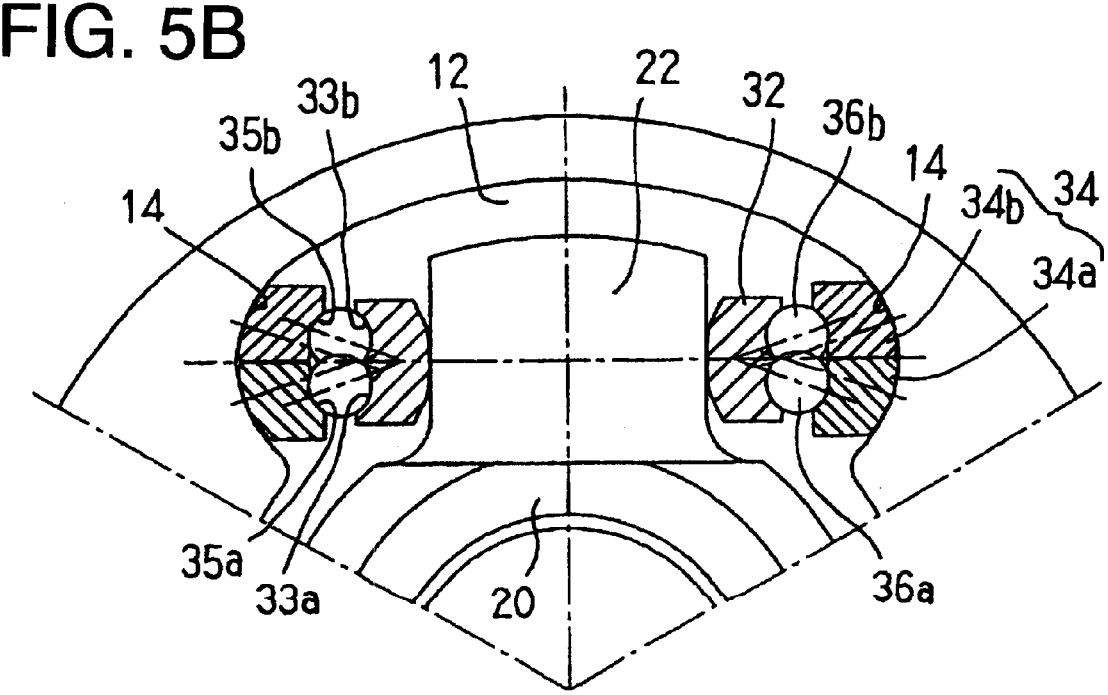

Further, in the form shown in FIGS. 4A and 4B, the intersection between the lines of actions representing the angle of contact between the balls 36 and the raceway surfaces 33a, 33b; 35a, 35b coincides with the center of curvature of the outer peripheral surface of the roller 34, but such coincidence is not absolutely necessary. For example, as shown in FIGS. 5A and 5B, the radius of curvature of the outer peripheral surface of the roller 34 may be reduced so that the center of curvature of the outer peripheral surface of the roller 34 may, as seen in a plane perpendicular to the axis of the roller 34, be located radially outward of the intersection between the lines of action representing the angle of contact between the balls 36 and the raceway surfaces 33a, 33b; 35a, 35b. In addition, the relation between the distance between the ball rows shown in FIGS. 5A and 5B is the same as the relation shown in FIGS. 4A and 4B. That is, in the embodiment, shown in FIG. 5A, the distance between the ball rows axially of the two rows of balls 36a and 36b is set greater than the diameter of the balls 36, whereas in FIG. 5B the distance between the ball rows is set less than the diameter of the balls 36.

In the form shown in FIGS. 4A and 4B, the distance between the points of contact between the balls 36a, 36b and the roller portions 34a, 34b is greater than the distance between the points of contact between the roller portions 34a, 34b and the roller guide surface 14. Therefore, during transmission of torque between the outer joint member 10 and the trunnion 22, the roller portions 34a and 34b, which appear below and above in FIGS. 4A and 4B, are subjected to the actions of counterclockwise and clockwise moment loads, respectively, thus propping against each other. On the other hand, in the case of FIGS. 5A and 5B, the distance between the points of contact between the balls 36a, 36b and the roller portions 34a, 34b is less than the distance between the points of contact between the roller portions 34a, 34b and the roller guide surface 14. Therefore, during transmission of torque between the outer joint member 10 and the trunnion 22, the roller portions 34a and 34b, which appear below and above in FIGS. 5A and 5B, are subjected to the actions of clockwise and counterclockwise moment loads, respectively, thus propping against each other. At any rate, the roller portions 34a and 34b prop against each other, which is advantageous from the standpoint of maintaining the unity of the roller assembly.

Figure 3:
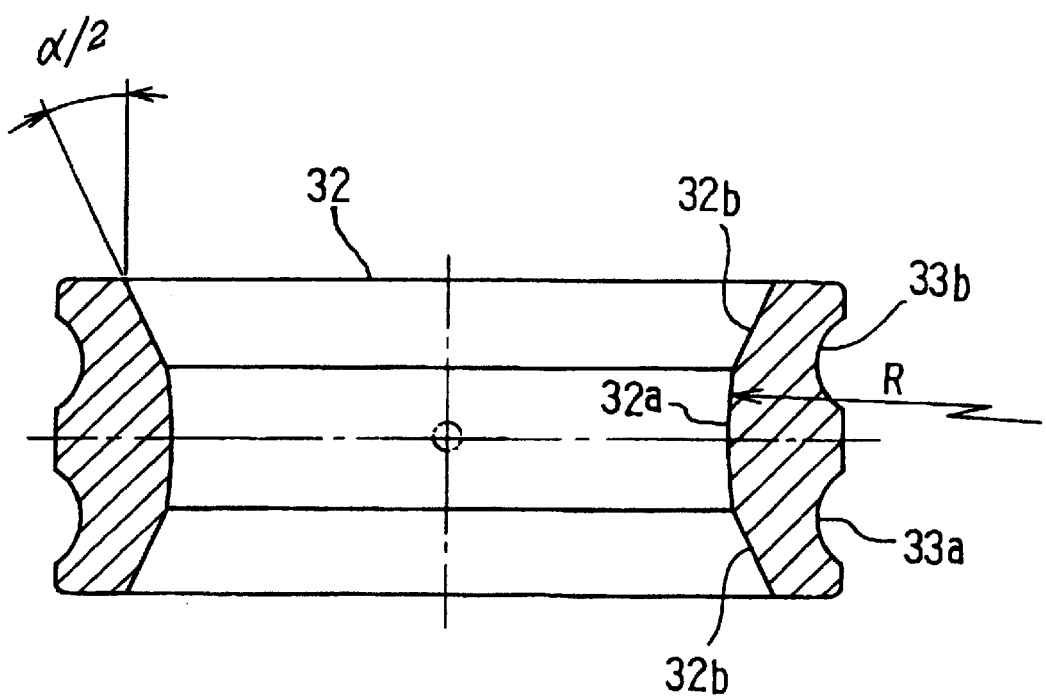
FIG. 3 is an enlarged sectional view of a ring.

As shown in FIG. 3, the inner peripheral surface of the ring 32 has an arcuately convex cross section. That is, the generating line of the inner peripheral surface is a convex arc of radius R. This, coupled with the fact that the longitudinal sectional shape of the trunnion 22 is substantially elliptic as described above and that a predetermined clearance is defined between the trunnion 22 and the ring 32, ensures that the ring 32 is capable of not only moving axially of the trunnion 22 but also oscillating with respect to the trunnion 22. Further, the ring 32 and the roller 34, which are relatively rotatably unitized through the balls 36, as described above, are capable of oscillating as a unit with respect to the trunnion 22. The term "oscillating" as used herein means that in the plane including the axis of the trunnion 22, the axes of the ring 32 and roller 34 incline with respect to the axis of the trunnion 22 (see FIG. 2A).

The inner peripheral surface of the ring 32 may be a convex arc substantially throughout the length, however, the generating line of the inner peripheral surface of the ring 32 may also be formed as a combination of the middle arc portion 32a and relief portions 32b on both sides. The relief portion 32b is a portion for avoiding interference with the trunnion 22 when an operating angle θ is taken as shown in FIG. 2A and is formed by a straight line or curve gradually increased in diameter from the end of the arc portion 32a to the end of the ring 32. In this embodiment, the relief portion 32b is illustrated as part of a conical surface with a conical angle α=50°.

Figure 2B:
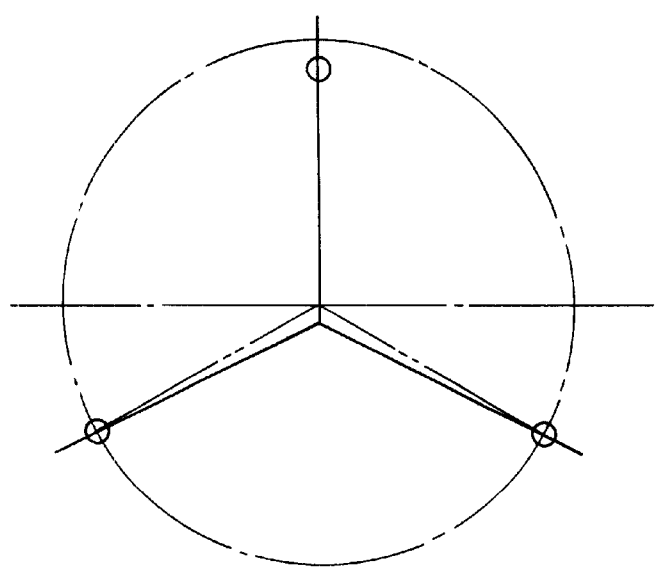
FIG. 2B is a schematic side view of a tripod member shown in FIG. 2A.

In the tripod type constant velocity universal joint, mechanically, the tripod member 20 swings three times around the center of the outer joint member 10 when the latter rotates one turn. Then, the eccentric amount denoted by the character e (in FIG. 2A) increases in proportion to the operating angle θ. And the three trunnions 22 are spaced 120° apart from each other. At an operating angle θ, considered with the vertical trunnion 22 which appears in the upper space in FIG. 2B taken as the reference, the other two trunnions 22 are slightly inclined from their axes when the operating angle shown in dash-two-dot lines is zero. The inclination is about 2–3° when the operating angle θ is about 23°, for example. Since this inclination is easily allowed by the curvature of the inner peripheral surface of the ring 32, the surface pressure in the region of contact between the trunnion 22 and the ring 32 can be prevented from becoming too high. In addition, FIG. 2B schematically shows the tree trunnions 22 of the tripod member 20 as seen from the left in FIG. 2A, the solid lines indicating the trunnions.

Figure 14A:
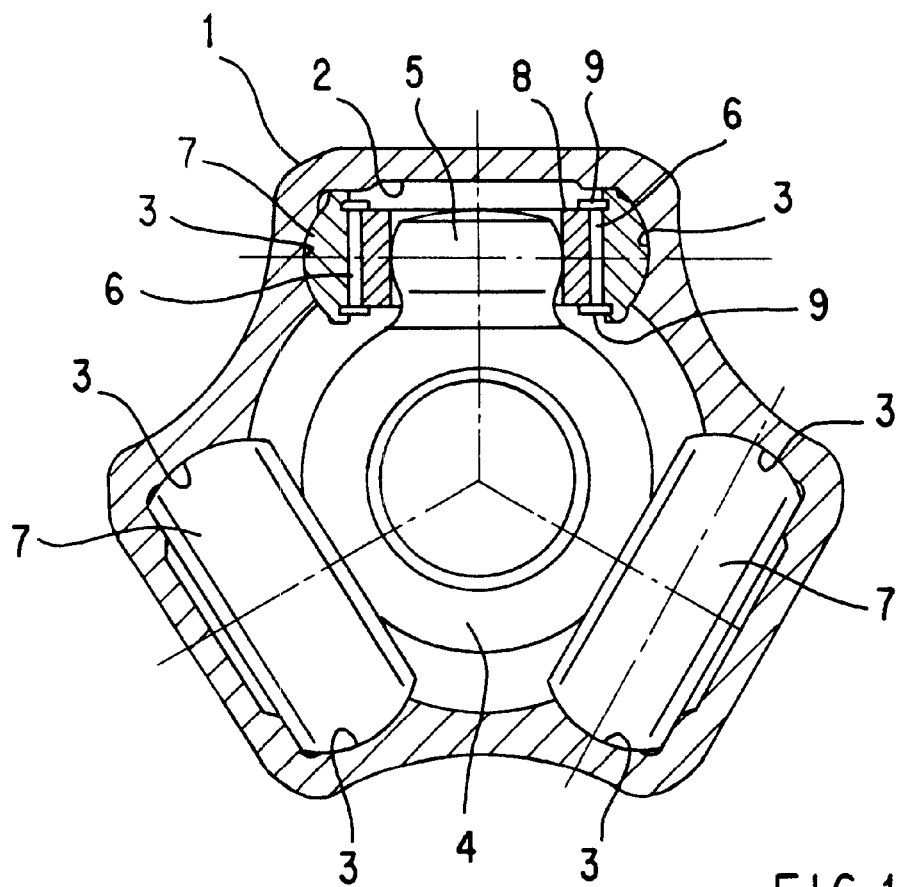
FIG. 14A is a cross sectional view of another conventional constant velocity universal joint
Figure 14B:
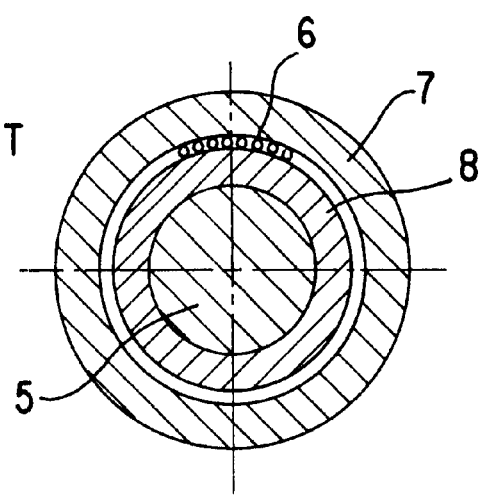
FIG. 14B is a sectional view taken perpendicularly to a trunnion.
Figure 14C:
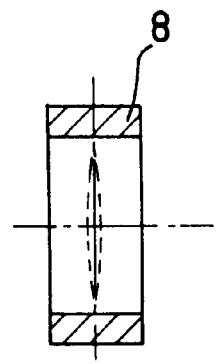
FIG. 14C is a sectional view of a ring for explaining a contact ellipse.

In the case of the conventional joint shown in FIG. 14A, since the outer peripheral surface of the trunnion 5 contacts the inner peripheral surface of the ring 8 throughout its periphery, the contact ellipse presents a circumferentially extending oblong form shown in broken lines in FIG. 14C. Therefore, when the trunnion 5 inclines with respect to the outer joint member 1, a friction moment is produced which acts to incline the ring 8 and hence the roller 7 with the movement of the trunnion 5. In contrast therewith, in the embodiment shown in FIG. 1A, since the cross section of the trunnion 22 is elliptic and the inner peripheral surface of the ring 32 is cylindrical, their contact ellipse is nearly a dot as shown in dash-two-dot lines in FIG. 3 and the area of contact is also small. Therefore, when torque is transmitted at an operating angle, the force tending to incline the roller assembly (32, 34, 36) is greatly reduced as compared with that in the prior art and the stability of the attitude of the roller 34 is further improved.

Further, in the conventional joint shown in FIG. 14A, for the purpose of controlling the inclination of the roller 7, a flange opposed to the end surface of the roller 7 is formed in the innermost region of the track groove 2, i.e., on the major diameter side as seen in a cross section of the outer joint member 1. However, in each of the above embodiments and embodiments to be later described, the need for inclining the roller 34 is reduced, so that it is not absolutely necessary to provide such flange; the flange may be omitted. As a result, even if the roller 34 temporality swings for some reason or other, there is no need whatever to worry about contacting a flange to produce sliding friction.

In embodying the embodiment shown in FIG. 1A, since the trunnion 22 elliptic in cross section contacts the annular ring 32, as shown in FIG. 1B, to transmit torque, it is necessary to reduce the surface pressure in the region of contact between the two. Concrete embodiments for this purpose will be described hereinafter. In addition, in FIGS. 9B through 12, the vertical direction in the paper is the direction of torque transmission, i.e., is the loaded side, and horizontal direction in the paper is the nonloaded side.

Figure 9A:
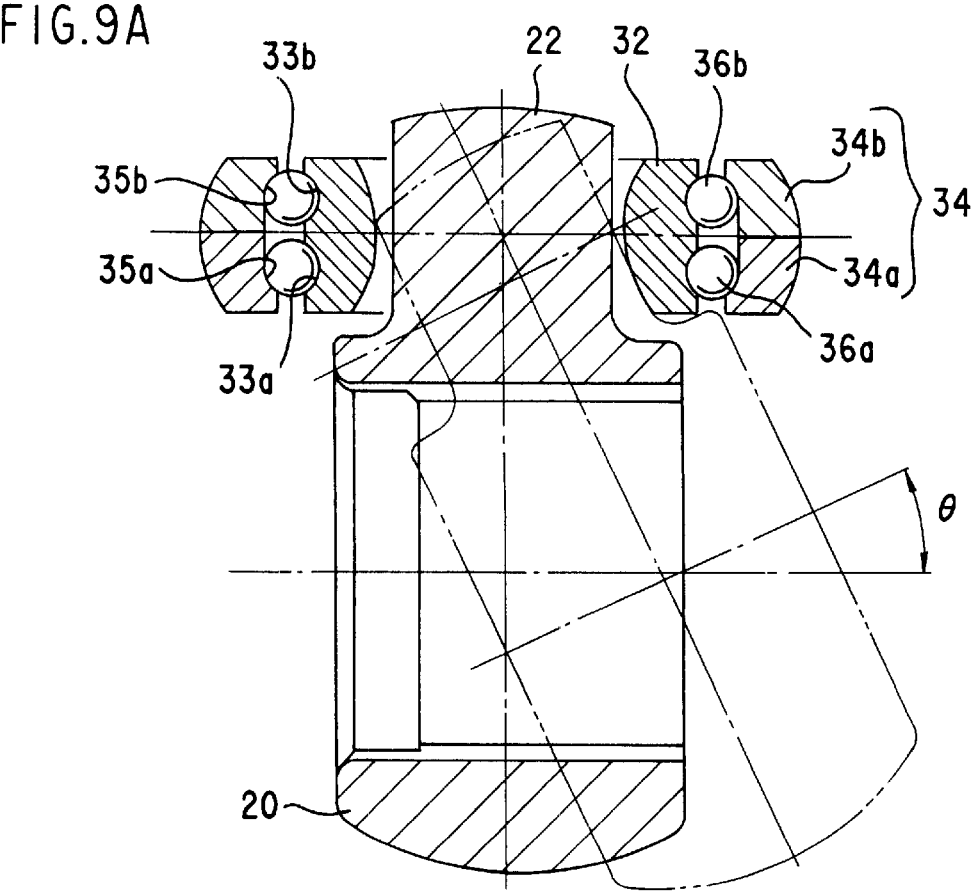
FIG. 9A is a sectional view of roller assembly and a tripod member.
Figure 9B:
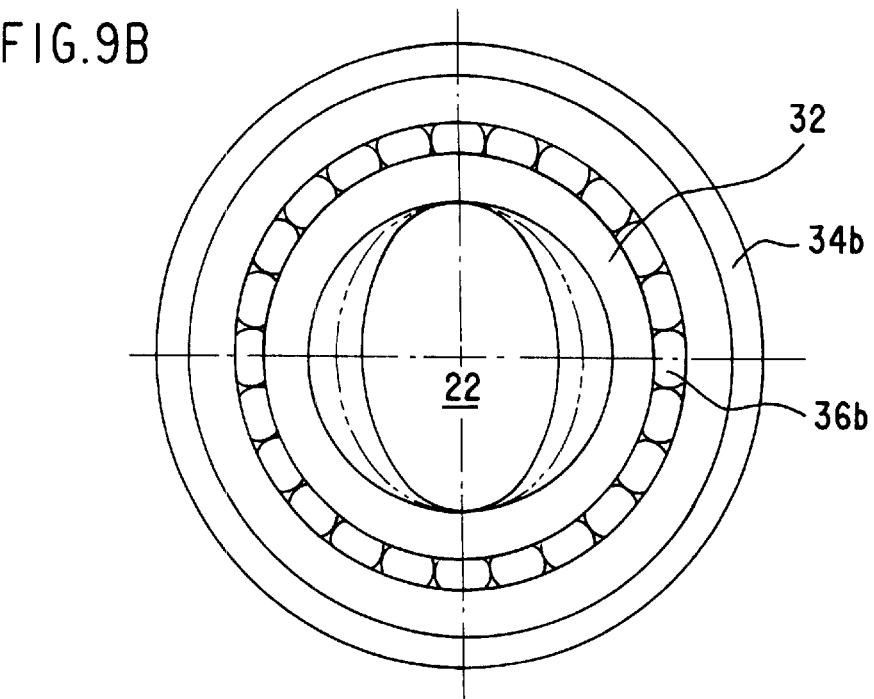
FIG. 9B is a plan view of the roller assembly shown in FIG. 9A.

When the joint transmits torque at a operating angle θ, the trunnion 22 swings to and fro within the range of the operating angle θ with respect to the ring 32, as shown in FIGS. 2A and 9A. Then, concerning the nonloaded side, since there is a relatively large clearance between the trunnion 22 and the ring 32, the trunnion 22 is allowed to swing without interfering with the ring 32. Concerning the loaded side, however, as the operating angle θ increases and so does the inclination of the trunnion 22, the apparent curvature of the trunnion 22 increases as shown in dash-two-dot lines in FIG. 9B, until it exceeds the inner diameter of the ring 32, whereupon the trunnion 22 and the ring 32 contact each other at two points. Thereafter it is not possible for the trunnion 22 alone to freely incline, and the inclination thereof causes the ring 32 and hence the roller assembly (32, 34, 36) to incline. Therefore, the cross-sectional shape of the trunnion 22, particularly its shape on the loaded side, is determined so that the trunnion 22 alone can incline without interfering with the ring 32.

Figure 10:
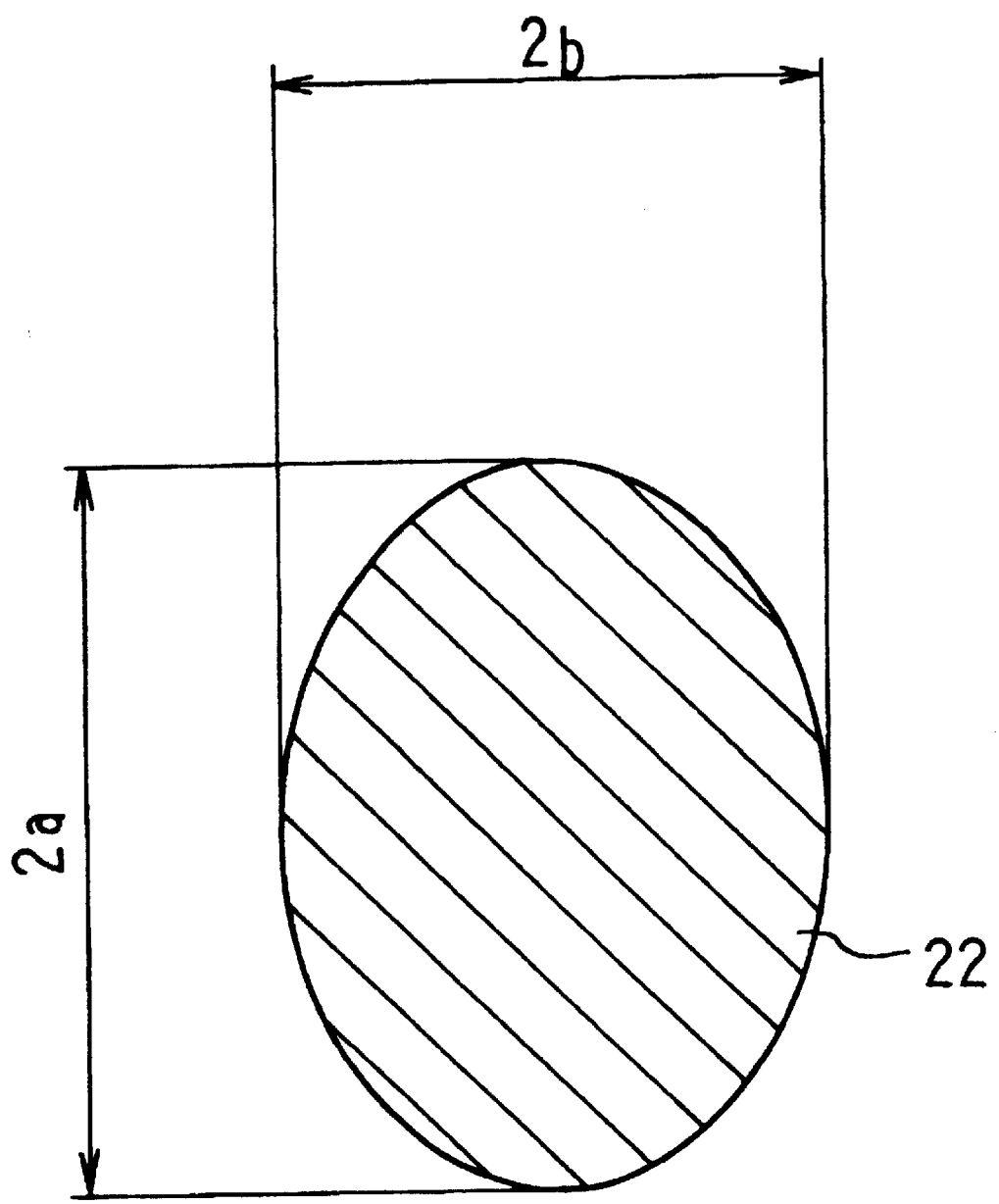
FIG. 10 is a cross sectional view of a trunnion.

Stated concretely, if the major and minor radii a and b of the elliptic cross-section of the trunnion 22, as shown in FIG. 10, and the radius of curvature R of the inner peripheral surface of the ring 32 are set as follows when the maximum operating angle θ max is 25°, in which case it is possible to ensure that the ring 32 will not incline even when the joint takes the maximum operating angle and that when the operating angle is 0°, the contact ellipse between the trunnion 22 and the ring 32 approaches a circle (minimum ellipse).

b/a=0.841
R=2.380 a.

If the recommended range of radius of curvature R is 0.5R–1.5 R, i.e., 1.190a–3.570a, then the ellipse factor b/a is 0.983–0.669.

Although the above setting is possible in terms of shape, however, in actual use of automobiles, there is worry that the surface pressure between the trunnion 22 and the ring 32 would become too high. Therefore, if low vibration can be obtained in the working operating range in the use of automobiles, the surface pressure can be lowered by reducing the operating angle to the extent that the roller assembly (32, 34, 36) will not incline, such measure being practical.

For example, if the working operating angle θ is greater than 10° but less than 20°, then the optimum values and recommended ranges of (1) the curvature of radius R of the inner peripheral surface of the ring, and (2) b/a of the ellipse are as shown in table 1.

TABLE 1

|     | Working angle θ (°) | Optimum value (minimum surface pressure) | Recommended Range | |
|-----|------|--------|--------|--------|
|     |      |        | 0.5R   | 1.5R   |
| R   | 20   | 2.939a | 1.469a | 4.408a |
|     | 15   | 3.888a | 1.944a | 5.832a |
|     | 10   | 5.810a | 2.905a | 8.715a |
| b/a | 20   | 0.866  | 0.972  | 0.745  |
|     | 15   | 0.894  | 0.968  | 0.812  |
|     | 10   | 0.925  | 0.973  | 0.875  |

Figure 11:
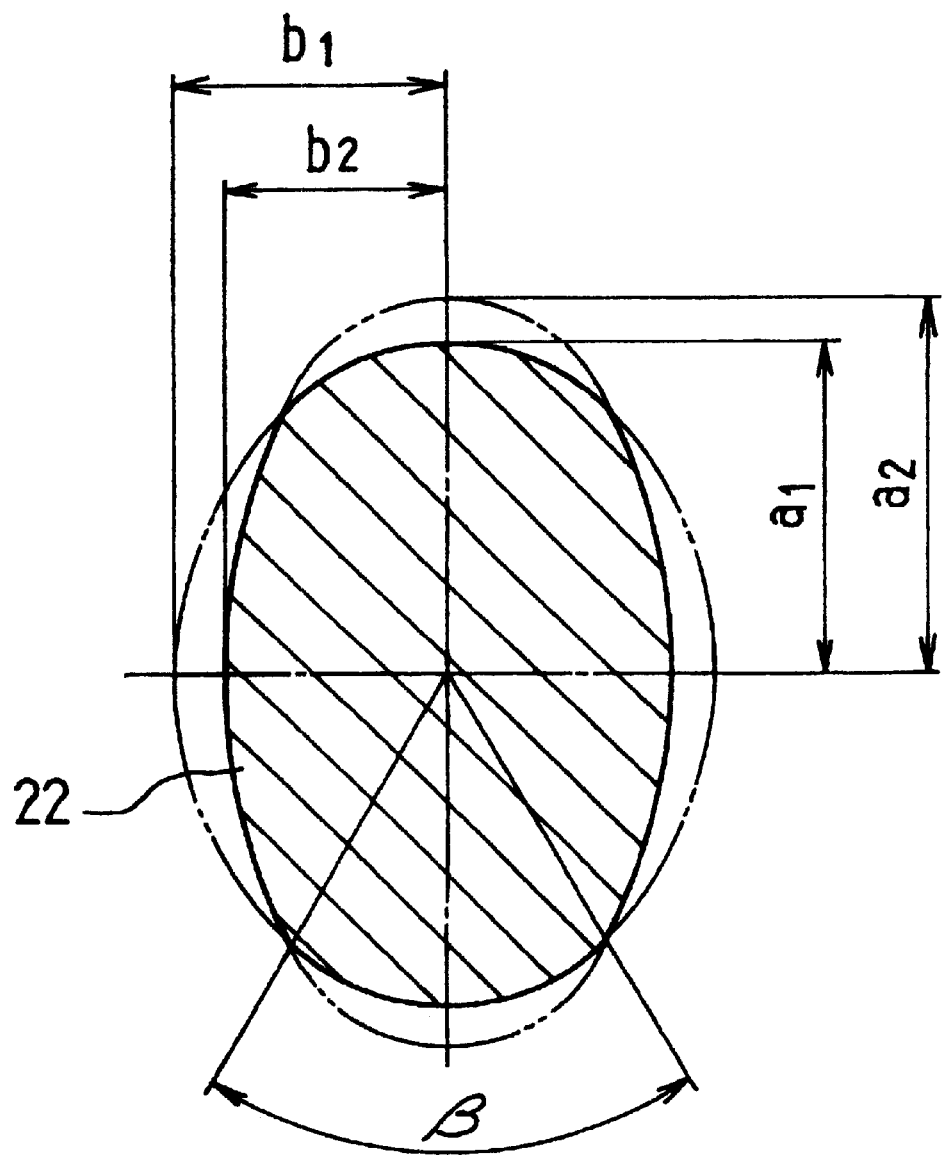
FIG. 11 is a cross sectional view of a trunnion.

As already described, the more the ellipse factor b/a of the trunnion 22 of the elliptic cross section is reduced, the greater operating angle can be taken to incline the trunnion 22 without including the roller assembly (32, 34, 36). However, on the other hand, the surface pressure in the contact region increases and the strength of the trunnion 22 decreases. Therefore, the embodiment shown in FIG. 11 is of complex elliptic shape with the cross-sectional shape of the trunnion 22 so designed that only for the region in contact with the ring 32, i.e., the contact region β the ellipse factor $b_1/a_1$ is increased and for the other noncontact region the ellipse factor $b_2/a_2$ is of such a degree as not to interfere at the maximum operating angle. For example, in the case where the working operating angle θ is 15° and the radius of curvature R of the inner peripheral surface of the ring 32 is 3.888a, the ellipse factor $b_1/a_1$ of the contact region is 0.894 and the ellipse factor $b_2/a_2$ of the noncontact region is 0.704. In addition, while the contact region β is shown only in the lower region in FIG. 10, since the cross section of the trunnion 22 is symmetrical, it goes without saying that such contact region also exists in the upper region in the figure.

Figure 12:
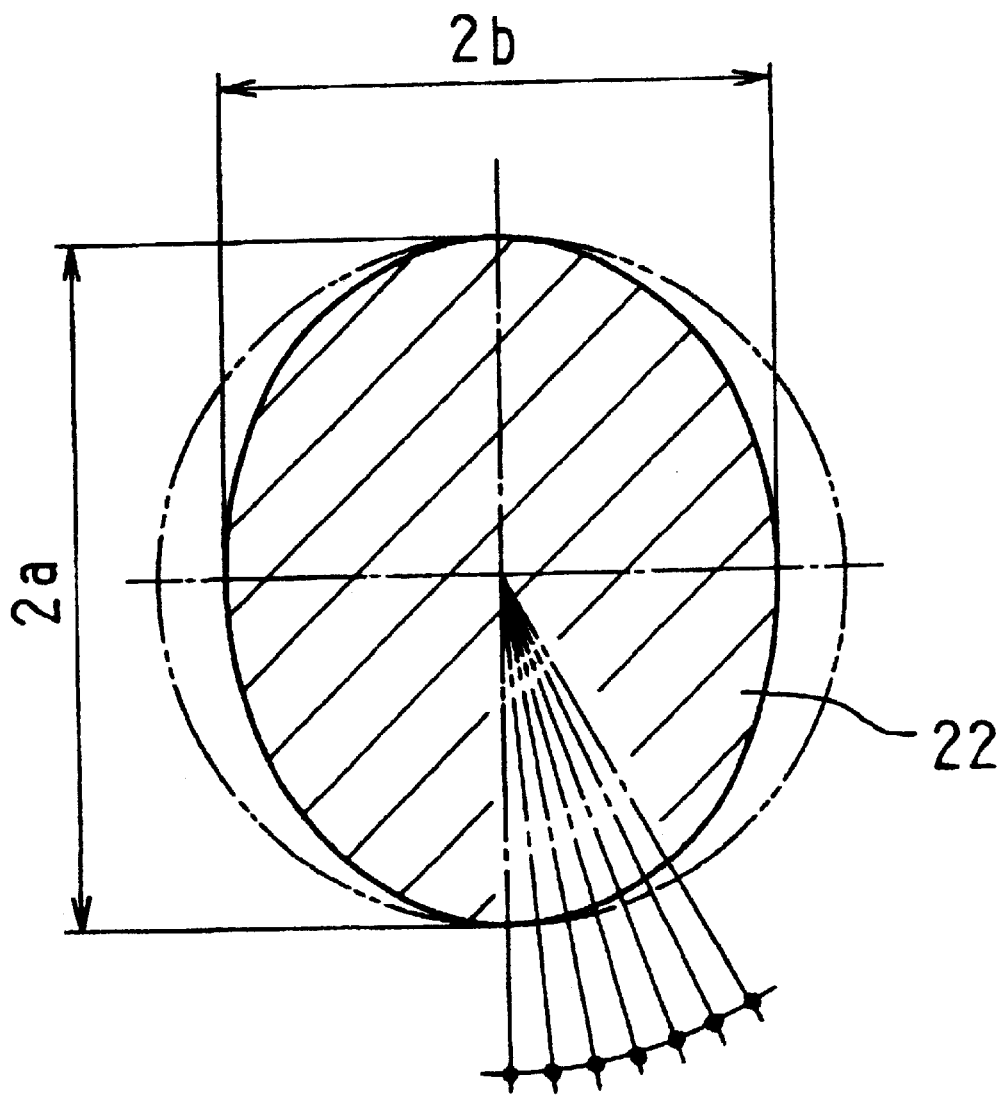
FIG. 12 is a cross sectional view of a trunnion.
Figure 13A:
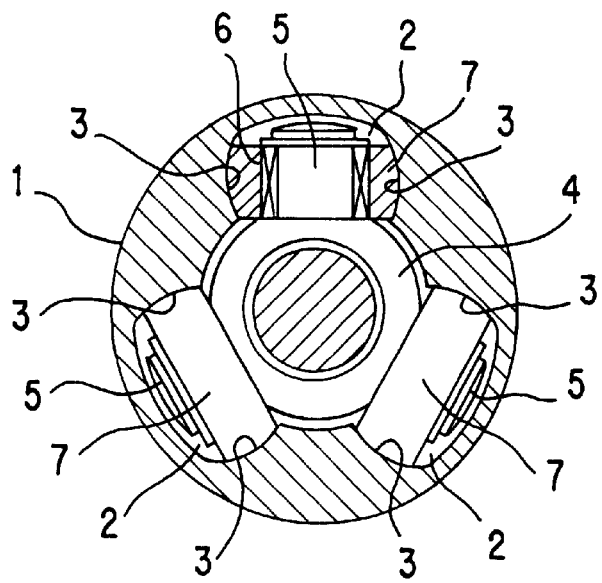
FIG. 13A is a cross sectional view of a conventional constant velocity universal joint.
Figure 13B:
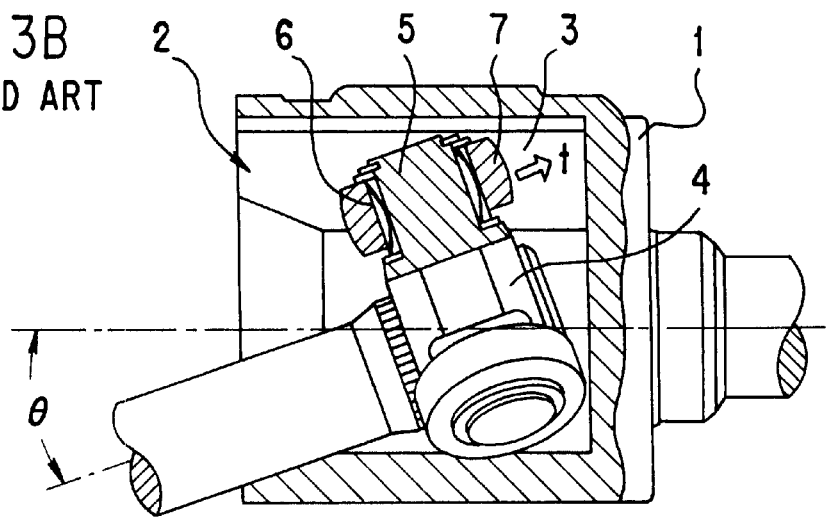
FIG. 13B is a longitudinal sectional view of the joint shown in FIG. 13A.
Figure 13C:
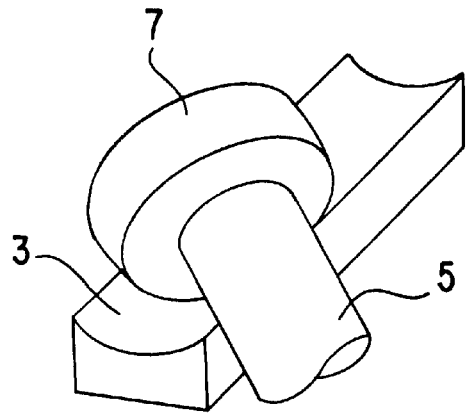
FIG. 13C is a schematic perspective view showing the relative relation between a roller and a roller guide surface.

Further, in the embodiment shown in FIG. 12, the contact region β is not composed of a single ellipse but the ellipse factor (b/a) is continuously changed. For example, if, as in the above case, the working operating angle θ is 15° and the radius of curvature R of the inner peripheral surface of the ring 32 is 3.888a, then in the contact region the ellipse factor is 1.0 at the position crossing the major axis and gradually decreases as the spacing from the position increases, while in the noncontact region the ellipse factor is 0.704. Alternatively, irrespective of whether the region is the contact region or noncontact region, the shape may be such that the ellipse factor gradually decreases from 1.0 to 0.704 from the major axis to the minor axis. FIG. 11 shows by way of example the case where the ellipse factor is 1.0 at the position crossing the major axis of the contact region and as the spacing from the position increases, the radius of curvature is gradually reduced, e.g., at predetermined angular intervals as shown.

Figure 6:
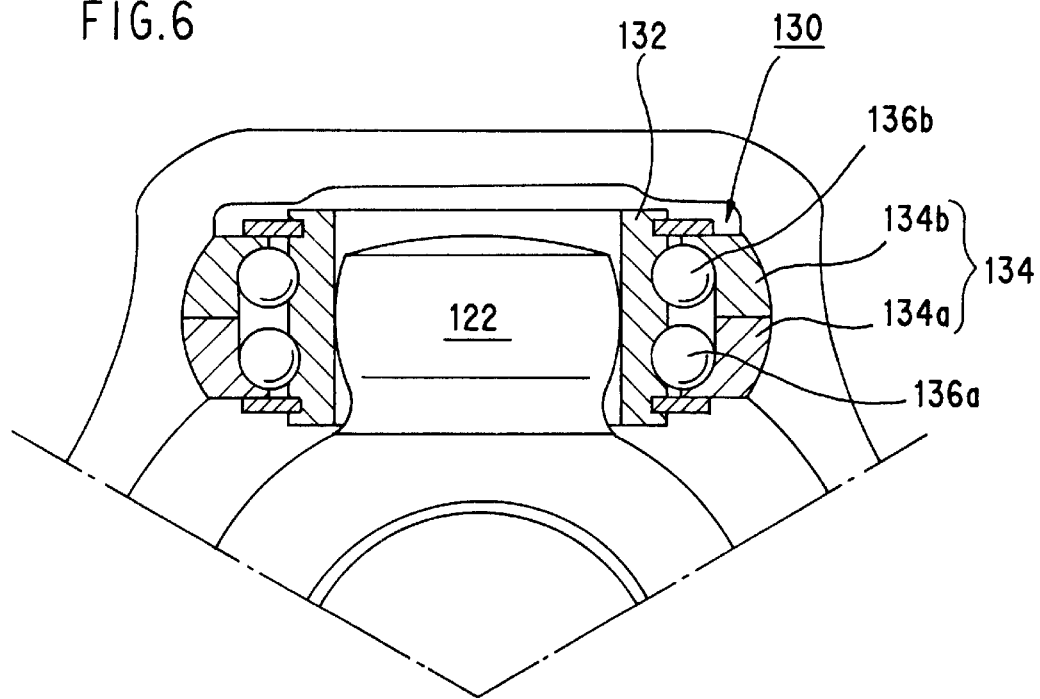
FIG. 6 is a sectional view of a constant velocity universal joint showing a sixth embodiment.
Figure 7:
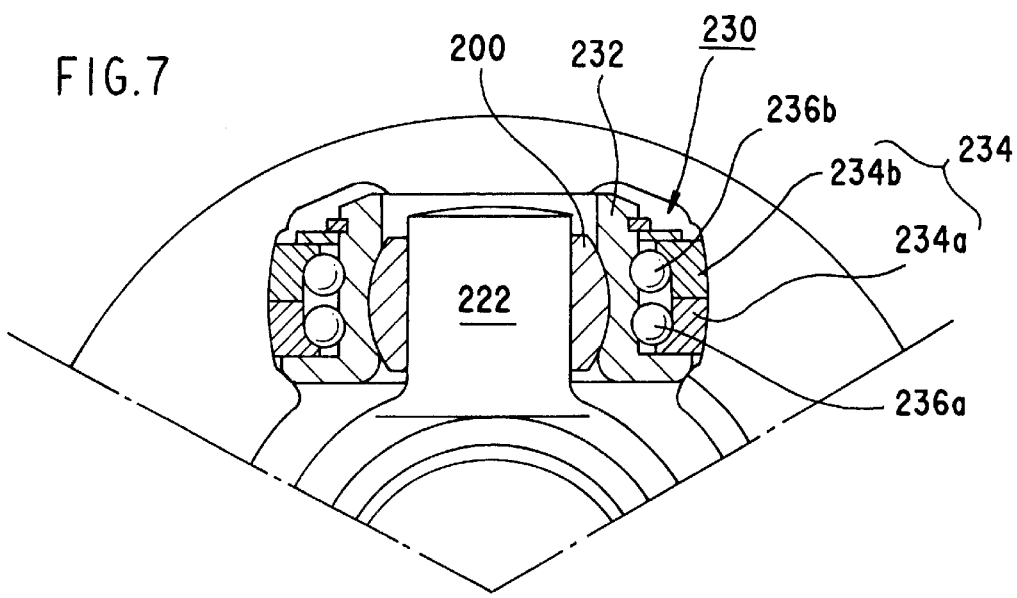
FIG. 7 is a sectional view of a constant velocity universal joint showing a seventh embodiment.
Figure 8:
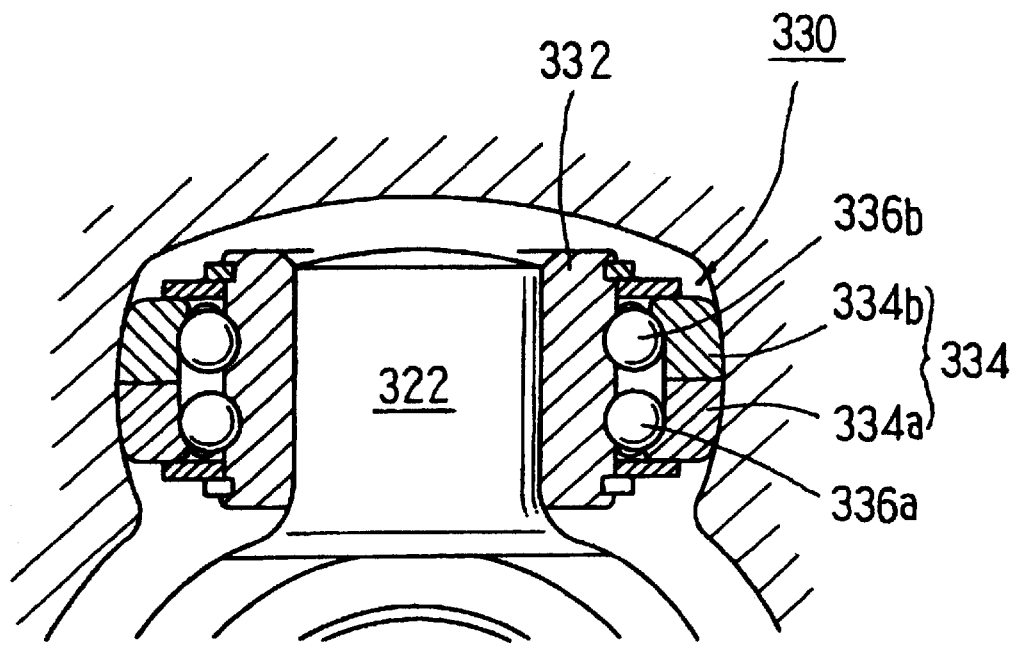
FIG. 8 is a sectional view of a constant velocity universal joint showing an eighth embodiment.

FIGS. 6 through 8 show other embodiments. The constant velocity universal joint shown in FIG. 6 has a roller assembly 130 which is composed of a ring 132 and a roller 134 which are capable of relative rotation through balls 136*a* and 136*b*, the cylindrical inner peripheral surface of the ring 132 being fitted on the spherical outer peripheral surface of the trunnion 122. As seen in a section perpendicular to the axis of the trunnion 122, the radius of curvature of the outer peripheral surface of the trunnion 122 differs from that of the inner peripheral surface of the ring 132, whereby a clearance is defined therebetween to facilitate entry of lubricating agent into between the slide surfaces. As a result, the lubricating performance is improved to reduce the frictional resistance, controlling heat generation, wear, flaking, adhesion, etc. of the slide surfaces, leading to improved durability of the constant velocity universal joint.

In the constant velocity universal joint of FIG. 7, the roller assembly 230 is composed of a ring 232 and a roller 234 which are relatively rotatable through balls 236*a* and 236*b*, and a bush 200 whose outer peripheral surface is convexly spherical and whose inner peripheral surface is cylindrical is interposed between the concavely spherical inner peripheral surface of the ring 232 and the cylindrical outer peripheral surface of the trunnion 222.

In the constant velocity universal joint of FIG. 8, the roller assembly 330 is composed of a ring 332 and a roller 334 which are relatively rotatable through balls 336*a* and 336*b*, the ring 332 being slidably fitted on the cylindrical outer peripheral surface of the trunnion 322. In this case, unlike other embodiments, the roller assembly 330 is only capable of moving axially of the trunnion 322; it does not perform the so-called oscillating motion.

What is claimed is:

1. A constant velocity joint comprising:
   an outer joint member formed with three track grooves having roller guide surfaces arranged in circumferentially opposed relation to each other;
   a tripod member having three radially projecting leg shafts;
   a plurality of rollers inserted in said track grooves; and
   a ring fitted directly on each of said leg shafts to support said rollers for rotation, said rollers being movable along the roller guide surfaces axially of the outer joint member,
   wherein each roller includes a set of annular roller portions and a plurality of balls interposed between outer raceway surfaces formed in rows in an inner periphery of the annular roller portions and two rows of inner raceway surfaces formed in an outer periphery of said ring.

2. A constant velocity joint as set forth in claim 1, wherein a longitudinal section of an outer peripheral surface of said each roller is convexly arcuate and a cross section of said each roller guide surface is concavely arcuate.

3. A constant velocity joint as set forth in claim 1, wherein each ball and said inner and outer raceway surfaces contact each other at a contact angle.

4. A constant velocity joint as set forth in claim 1, wherein said each roller and corresponding roller guide surface make angular contact with each other.

5. A constant velocity joint comprising,
   an outer joint member formed with three track grooves having roller guide surfaces arranged in circumferentially opposed relation to each other;
   a tripod member having three radially projecting leg shafts;
   a plurality of rollers inserted in said track grooves; and
   a ring fitted on each of said leg shafts to support said rollers for rotation, said rollers being movable along the roller guide surfaces axially of the outer joint member,
   wherein each roller includes a set of annular roller portions and a plurality of balls interposed between outer raceway surfaces formed in rows in an inner periphery of the annular roller portions and two rows of inner raceway surfaces formed in an outer periphery of said ring, and wherein an inner peripheral surface of said ring has a convexly arcuate section and an outer peripheral surface of each leg shaft has a sectional shape which contacts the inner peripheral surface of said ring in a direction orthogonal to an axis of the constant velocity joint and which defines a clearance between said each leg shaft and the inner peripheral surface of said ring axially of the constant velocity joint.

6. A constant velocity joint as set forth in claim 5, wherein a longitudinal section of an outer peripheral surface of said each roller is convexly arcuate and a cross section of a corresponding roller guide surface is concavely arcuate.

7. A constant velocity joint as set forth in claim 5, wherein each ball and a corresponding raceway surface contact each other at a contact angle.

8. A constant velocity joint as set forth in claim 5, wherein said each roller and a corresponding roller guide surface make angular contact with each other.

9. A constant velocity joint as set forth in claim 5, wherein a cross section of each leg shaft is elliptic with a major axis orthogonal to an axis of the constant velocity joint and $b/a$ is 0.669–0.983 where a is a major radius and b is a minor radius.

10. A constant velocity joint as set forth in claim 9, wherein a longitudinal section of an outer peripheral surface of said each roller is convexly arcuate and a cross section of a corresponding roller guide surface is concavely arcuate.

11. A constant velocity joint as set forth in claim 9, wherein each ball and said inner and outer raceway surfaces contact each other at a contact angle.

12. A constant velocity joint as set forth in claim 9, wherein said each roller and a corresponding roller guide surface make angular contact with each other.

* * * * *